United States Patent
Dantin et al.

(10) Patent No.: US 9,932,489 B2
(45) Date of Patent: Apr. 3, 2018

(54) REDISPERSIBLE DRY COMPOSITION OF POLYMER FINISHES OR OTHER PRODUCTS FOR THE CONSTRUCTION

(75) Inventors: Veronique Dantin, Saint Quentin Fallavier (FR); Gerard Leplay, Saint Quentin Fallavier (FR); Paulo Goncalo, Saint Quentin Fallavier (FR); Carlos Nones, Riverside, CA (US); Pedro Paredes, Riverside, CA (US)

(73) Assignee: PAREXGROUP SA, Issy les Moulineaux (FR)

(*) Notice: Subject to any disclaimer, the term of this patent is extended or adjusted under 35 U.S.C. 154(b) by 0 days.

(21) Appl. No.: 13/809,519

(22) PCT Filed: Jul. 13, 2011

(86) PCT No.: PCT/EP2011/062001
§ 371 (c)(1),
(2), (4) Date: Apr. 30, 2013

(87) PCT Pub. No.: WO2012/007529
PCT Pub. Date: Jan. 19, 2012

(65) Prior Publication Data
US 2013/0210963 A1    Aug. 15, 2013

(30) Foreign Application Priority Data
Jul. 16, 2010  (WO) .................. PCT/EP2010/060337

(51) Int. Cl.
| | | |
|---|---|---|
| C09D 133/06 | (2006.01) |
| C04B 26/02 | (2006.01) |
| C04B 26/04 | (2006.01) |
| C04B 26/06 | (2006.01) |
| C04B 28/06 | (2006.01) |
| C04B 28/16 | (2006.01) |
| C09D 5/02 | (2006.01) |
| C04B 103/00 | (2006.01) |
| C04B 111/00 | (2006.01) |
| C04B 111/10 | (2006.01) |
| C04B 111/21 | (2006.01) |
| C04B 111/70 | (2006.01) |

(52) U.S. Cl.
CPC .......... *C09D 133/06* (2013.01); *C04B 26/02* (2013.01); *C04B 26/04* (2013.01); *C04B 26/06* (2013.01); *C04B 28/06* (2013.01); *C04B 28/16* (2013.01); *C09D 5/024* (2013.01); *C04B 2103/0057* (2013.01); *C04B 2103/0078* (2013.01); *C04B 2111/00517* (2013.01); *C04B 2111/1031* (2013.01); *C04B 2111/1037* (2013.01); *C04B 2111/21* (2013.01); *C04B 2111/70* (2013.01); *Y02W 30/97* (2015.05)

(58) Field of Classification Search
CPC ................................. C09D 5/024; C08K 5/06
USPC ......................... 524/366, 414, 425
See application file for complete search history.

(56) References Cited

U.S. PATENT DOCUMENTS

| | | | |
|---|---|---|---|
| 3,867,335 A | | 2/1975 | Reed et al. |
| 4,071,639 A | * | 1/1978 | Palmer et al. ................. 427/156 |
| 5,959,017 A | * | 9/1999 | Eck ............................ C08J 3/22 524/425 |
| 2005/0250899 A1 | | 11/2005 | Bacher et al. |
| 2011/0306705 A1 | * | 12/2011 | Dombrowski .......... C04B 28/02 524/5 |
| 2012/0101186 A1 | * | 4/2012 | Nones .................. C09D 133/08 523/122 |

FOREIGN PATENT DOCUMENTS

| | | |
|---|---|---|
| CN | 101481584 | 7/2009 |
| DE | 19910602 | 11/2000 |
| EP | 1182235 | 2/2002 |
| EP | 1593721 | 11/2005 |
| GB | 2155944 | 10/1985 |
| JP | 2006335597 | 12/2006 |
| WO | 2001/077242 | 10/2001 |

OTHER PUBLICATIONS

OMYA (Data of OMYACARB 5), 2002.*
International Search Report in PCT/EP2010/060337 dated Jul. 6, 2011.
International Search Report in PCT/EP2011/062001 dated Feb. 15, 2012.
Bulatovic, "Handbook of Flotation Reagents—Chemistry, Theory and Practice: Flotation of Sulfide Ores", Apr. 2007, 448 pages, vol. 1, Elsevier Science & Technology Books.

* cited by examiner

*Primary Examiner* — Wenwen Cai
(74) *Attorney, Agent, or Firm* — James C. Lydon

(57) ABSTRACT

The invention relates to improved non-efflorescing cement-free and water-dispersible powder building material compositions comprising a homopolymer or copolymer as binder, useful for the preparation of wet formulations of plasters grouts, waterproofing coatings or mortars for the construction and the civil engineering industry. The binder is obtained by spray-drying or lyophilization of a dispersion containing a polymer and a protective colloid. These compositions also comprise a deprotection agent and a specific adsorbent filler. The invention also refers to the methods of preparation of these dry compositions and wet formulations, the application of these latter onto the surface of buildings or civil engineering works, the so obtained coatings as well as the so coated elements. The hardened products obtained therefrom are remarkably water-resistant, non efflorescent and easy to obtain.

11 Claims, No Drawings

REDISPERSIBLE DRY COMPOSITION OF POLYMER FINISHES OR OTHER PRODUCTS FOR THE CONSTRUCTION

The present application is filed pursuant to 35 U.S.C. 371 as a U.S. National Phase application of International Patent Application No. PCT/EP2011/062001, which was filed Jul. 13, 2011, claiming the benefit of priority to International Patent Application No. PCT/EP2010/060337, which was filed on Jul. 16, 2010. The entire text of the aforementioned applications is incorporated herein by reference in its entirety.

FIELD OF THE INVENTION

The technical field of the invention relates to plasters, renderings, grouts, waterproofing coatings or mortars notably for the interior or exterior of buildings, such as finishes or mortars for the external thermal insulation as well as joints for the construction.

In particular, the invention concerns water-dispersible powder building material compositions useful for the preparation of wet formulations of plasters or mortars for the construction and the civil engineering industry.

More particularly, the invention refers to cement-free and water-dispersible powder building material compositions comprising a homopolymer or a copolymer as binder.

The invention concerns also the methods of preparation of these dry compositions and wet formulations, the application of these latter onto the surface of buildings or civil engineering works, the so obtained coatings as well as the so coated elements. The applications of these wet formulations can be also joints or other products for the construction as well as mass objects.

BACKGROUND ART

Many liquid aqueous acrylic finishes are known. These are wet formulations containing an entirely organic binder made of an acrylic or styrene/acrylic or ethylene/vinylacetate polymer dispersion, a coalescent agent, a water retentive agent such as a cellulosic ether, a dispersant (e.g. a surfactant), a defoamer, a biocide, a carbonate sand and/or a silica sand, a carbonate filler, $TiO_2$, a mineral or organic thickener, a pH regulator, exogenous water and water from the polymer dispersion.

The acrylic or styrene/acrylic polymer dispersion of these acrylic finishes are obtained by emulsion polymerisation.

These known acrylic finishes are ready-to-use pastes which are applied on the exterior surfaces of buildings.

One knows moreover redispersible powders of acrylic or styrene/acrylic polymer. These powders are produced by spray drying of a dispersion of this acrylic or styrene/acrylic polymer, including a water-soluble protective colloid such as polyvinyl alcohol and/or polyacrylates and/or polyvinyl pyrrolidone. See notably EP-723975-A and U.S. Pat. No. 5,252,704. These powders can be used in mortar formulations containing a mineral binder (cement and/or lime).

One of the drawbacks of these cement-free pastes is that they badly withstand the frost and especially the cycles frost/thaw and more generally the thermal shocks.

Other drawbacks linked to the aqueous character of these known acrylic finishes, is also that:

(i) The water represents an additional cost in terms in of transport.
(ii) The water imposes to load the pasty acrylic finish with high levels of biocide.

These features (i) and (ii) make these known acrylic finishes not really environment friendly.

SUMMARY OF THE INVENTION

The present invention pursues at least one of the following objects.

It is an object of the invention to develop redispersible dry compositions of polymer finishes or of other products for the construction which would not have the drawbacks of the known aqueous pasty acrylic finishes or construction products.

It is an object of the invention to develop redispersible dry compositions of polymer finishes which would not be prone to induce efflorescence on the surface of plasters, renderings, coatings made from this composition.

It is an object of the invention to develop redispersible dry compositions of polymer finishes which would not have a highly basic pH after being redispersed into water, to manufacture wet formulations to be applied onto the surface of buildings or civil engineering works.

It is an object of the invention to develop redispersible dry compositions of polymer finishes which would not have an adverse effect on the processing properties (easiness and reproducibility of the mixing-workability-pumpability-non-tackiness-shotcreting- . . . ) or on the mechanical characteristics (water-resistance-hardness-durability-cracking strength- . . . ) of the hardened plasters, renderings, coatings made from these compositions.

It is an object of the invention to develop redispersible dry compositions of polymer finishes which could be mixed with water to manufacture wet formulations to be applied onto the surface of buildings or civil engineering works, to form hardened plasters, renderings or coatings, with protection and waterproofing properties.

It is an object of the invention to develop plasters, renderings, coatings with waterproofing and good-mechanical properties as well as protection, said plasters, renderings, coatings being obtained from dry compositions of polymer finishes easily redispersible in water.

It follows that the invention pertains to a redispersible dry composition of polymer finish or of other products for the construction comprising:

a) a powdery organic binder including a polymer obtained by spray-drying or lyophilisation of a dispersion containing said polymer and a protective colloid;
b) a deprotection agent;
c) a specific adsorbent filler;
d) and/or load;
e) and/or water retentive agent;
f) and/or a rheological agent;
g) and/or a defoamer;
h) and/or a biocide;
i) and/or a pigment;
j) and/or fibers;
k) and/or a mineral binder;
l) and/or a flame retardant (or flame proof agent).

In a remarkable variant, the redispersible dry composition according to the invention, is characterized by a dry % mass ratio specific filler c)*100/polymer a) that is greater or equal to, in an increasing preference order, 10, 20, 30, preferably greater or equal to 50, more preferably greater or equal to 150, and lower or equal to, in a decreasing preference order, 1200, 1000, 950, preferably lower or equal to 910, more preferably lower or equal to 850.

In an other remarkable variant, the redispersible dry composition according to the invention, is characterized by the water-resistance of a coating obtained from a slurry made by mixing of the dry composition with water to the correct consistency with respect to the whole mix water/dry composition, said water-resistance of the coating being measured according to the test ASTM D2486-06, is greater than, in an increased order of preference, 3000; 4000; 5000; 6000; 10000 cycles.

The thickness of the coating in the above mentioned test could vary from the one of ASTM D2486-06 norm. The thickness could increase if the granulometry of the largest load is greater to the 180 microns requested in the ASTM D2486-06. The thickness of the coating should then correspond to the maximum diameter of the largest load.

The <<correct consistency>> could be for instance determined by comparison with the following products:
- floor grout 5046 Elit from Parexlanko, mixed with water to a 27% (+/−1%) water mix ratio (for floor joint fillers);
- DPR Sandfine from the Parex company (for acrylic renders)
- 451 Lankotoit from the Parexlanko company (for roof waterproofing membranes)

In a particular embodiment, the redispersible dry composition of polymer finish according to the invention, comprise:
a) a powdery organic binder included a polymer obtained by spray-drying or lyophilisation of a dispersion containing said polymer and a protective colloid;
b) a deprotection agent;
c) a specific adsorbent filler;
d) a load;
e) a water retentive agent;
f) and/or a rheological agent;
g) and/or a defoamer;
h) and/or a biocide;
i) and/or a pigment.

This composition fulfils at least one of the above mentioned objects.

It is to the credit of the inventors to have designed a redispersible powder dry composition of plaster, mortar, rendering or finish, which is to address to the problem of redispersion in water of polymer-binded coatings or mass objects which are normally only water-resistant when resulting from alkaline aqueous slurries whose pH are greater than 10, especially greater than or equal to 11, and preferably to 12. Now, pH>12 are synonymous of formation of a powdery deposit on the surface of bodies, masonry units, etc., following a loss of water in open air (efflorescence).

In particular, the inventors succeeded in obtaining a dry composition which can be easily and rapidly transformed into a wet formulation, a slurry, the pH of which is below 10, preferably below 9, by mixing with a liquid, e.g. water.

It is then possible to get a coating or a mass object from this slurry. Said coating is advantageously water-resistant and not subject to efflorescence.

Water-resistance is a very interesting property of the coatings or of the mass objects which are the results of pH<10 slurries obtained from mixes of water and dry compositions according to the invention. The water-resistance can be notably given by the wet scrub test and the drip test hereinafter defined.

This result has been obtained notably by incorporating into the dry composition, at least a deprotection agent b) and at least a specific adsorbent filler c).

Such a dry powder composition makes it also possible to overcome the drawbacks of water in the known wet polymer finish formulations, namely strength to thermal shocks, biological instability and cost of transport.

Once redispersed in water, the dry composition forms a wet formulation with good properties of rheology, pumpability, workability, and durability.

And the hardened water-resistant and non-efflorescent coatings or the water-resistant and non-efflorescent joints or other mass objects obtained from this wet formulation have remarkable mechanical properties (hardness-cracking strength), and/or fireproofing and waterproofing properties, and/or decoration properties.

Definitions

According to the terminology of this text, the following non limitative definitions have to be taken into consideration:

Every singular designates a plural and reciprocally.

"polymer" refers to homopolymer or copolymer.

"finish" refers to any product for the construction (interior or exterior), e.g.: coatings, joints, mass objects . . .

The term "redispersible" or "redispersibility" used herein is taken to mean that the composition, if present in dry form, in particular as dry powder, is redispersible in aqueous media, in particular in water itself. This requirement of redispersibility is complied with by a re-obtained dispersion which is stable for preferably at least about 2 hours, in particular at least about 12 hours, and under ideal conditions more than 24 hours. In other words, there will not occur a significant precipitation. For the determination of such redispersibility the following method could preferably be employed: 50 g of an essentially lump-free powder are mixed with 50 g water in a beaker of a diameter of 8 cm and a maximum filling volume of 300 cm$^3$. Stirring is performed with a propeller mixer (3 propellers and a standard diameter of 60 mm) with 1.000 rpm. The dispersion obtained is visually evaluated after 5, 10, 15, 30 minutes, and 1, 2, 3 hours respectively.

"deprotection agent" refers to a compound or a mix of compounds which can wipe out at least one part of the protective effect of the protective colloid of the powdery organic binder a).

"cement" is a mineral binder, free from any organic compound.

"cement-free" means that the cement concentration is lower or equal to, in a increasing preference order and in % by weight of the composition, 5; 3; 1; 0.5; $10^1$; $10^{-3}$; $10^{-6}$.

"lime-free" means that the lime concentration is lower or equal to, in a increasing preference order and in % by weight of the composition, 5; 3; 1; 0.5; $10^{-1}$; $10^{-3}$; $10^{-6}$.

"granulometry" corresponds to the dry sieving $D_{50}$.

The granulometry of a "powder" is less or equal to 1 mm,

The granulometry of a "granulate" is greater than 1 mm, preferably less or equal to 10 mm.

"Filler" designates a fine and/or light mineral powdery loading material incorporated in the mortars, plasters, renderings or finishes, and the $D_{50}$ of which is lower than 100 µm.

"Load" designates a mineral powdery loading material incorporated in the mortars, plasters, renderings or finishes, and the $D_{50}$ of which is greater than 100 µm.

"Acrylic" refers to homopolymers or copolymers formed of monomers selected from the group of acrylate esters.

DETAILED DESCRIPTION OF THE INVENTION

In a preferred embodiment, the powder dry composition according to the invention is cement-free and/or lime-free.

Powdery Organic Binder a):

The polymer of the binder a) is preferably chosen from the group comprising, preferably consisting of: acrylic, acrylic/acrylic, styrene/acrylic, styrene/butadiene, vinyl-acetate/ethylene, vinyl-acetate/versatate and vinyl-acetate/versatate/ethylene polymer; the acrylic, acrylic/acrylic, styrene/acrylic polymer being preferred.

In a variant, the binder a) can comprise a combination of different polymers.

The protective colloid of the binder a) is, for instance a polyvinyl alcohol, or a low molecular weight surface active compound, or taken from the group of salts of arylsulfonic acid formaldehyde condensates (U.S. Pat. No. 5,225,478).

Deprotection Agent b)

Advantageously, the deprotection agent b) is chosen among those which are effective without increasing the pH of the dispersion obtained by mixing said composition with water, to a value greater than or equal to 10 and preferably greater than or equal to 9.

Regarding the quantitative aspect of the composition according to the invention, it is preferable that the dry % mass ratio deprotection agent b)*100/polymer a) be greater or equal to, in an increasing preference order, 1, 8, 10, 15, 20, 30, preferably comprised between 15 and 25.

Actually, the deprotection agent b) is e.g. chosen in the group of products comprising, preferably consisting of glycol either, sodium triphosphate, the glycol ethers being more preferably chosen in the group of products comprising, preferably consisting of ethylene glycol monomethyl ether, ethylene glycol monoethyl ether, Ethylene glycol monopropyl ether, ethylene glycol monoisopropyl ether, (2-isopropoxy)ethanol, ethylene glycol monobutyl ether, ethylene glycol monophenyl ether, ethylene glycol monobenzyl ether, diethylene glycol monomethyl ether, 2-(2-methoxyethoxy)ethanol, Methyl Carbitol, diethylene glycol monoethyl ether, 2-(2-ethoxyethoxy)ethanol, Carbitol Cellosolve, diethylene glycol mono-n-butyl ether, ethylene glycol dimethyl ether, ethylene glycol diethyl ether, ethylene glycol dibutyl ether, Ethylene glycol methyl ether acetate, ethylene glycol monethylether acetate, ethylene glycol monobutyl ether acetate, tripropylene glycol n-butyl ether, dipropylene glycol n-butyl ether, triethylene glycol monobutyl ether, and propylene glycol.

Specific Adsorbent Filler c)

The specific adsorbent filler c) is "specific" with respect to its "adsorption capacity" and/or to its oil absorption (OA). In a particularly advantageous embodiment, the specific adsorbent filler c) has an oil absorption (OA) according to ISO 787/5 and in g/100 g: OA greater than or equal to, in an increased order of preference: 1; 5; 10; 20, and for example comprised between 5 and 10.

Said specific adsorbent filler c) is selected preferably among siliceous, calcareous or siliceous-calcareous powders and/or aluminosilicate powders, and more preferably in the calcareous or marble fillers, and, more preferably in the group consisting of the following commercial products:

Beatite®: A carbonated load obtained from a "Pyrenean" calcite with a high chemical purity;

Omyacarb®: A dry ground Calcium Carbonate with an intermediate and closely sized particle distribution;

Mikhart® is a Calcium Carbonate and is produced by sieving or grinding the mineral Calcite.

Omya TITAN® 200; Calcium Carbonate 97% Magnesium Carbonate 2% Median Diameter: 25 µm;

CALCITEC PURO PH®: Calcium Carbonate produced through careful selection both in the mining and in the production stages, where dedicated lines are used to ensure high chemical purity characterized by a low content of heavy metals.

Load d)

Concerning the load d), it is advantageously chosen from the group of calcareous and/or siliceous sands, and/or perlite and/or vermiculite.

Water Retentive Agent e)

The water retentive agent e) has the property to keep the water of mixing before the setting. The water is so trapped in the wet formulation paste which improves its bond. To some extent, the water is less absorbed by the support. Salting out on the surface is limited and evaporation is reduced.

The water retentive agent e) is preferably chosen in the group comprising: modified cellulose ethers and/or starches ethers and/or guar ether and their mixes, more preferably consisting of: methylcelluloses, methylhydroxypropylcelluloses, methylhydroxyethylcelluloses and their mixes.

The possible rheological agent f) (also named a "thickener") is preferably chosen in the group comprising, more preferably consisting of: clays, starch ethers, cellulose ethers and/or gums (e.g. Welan guar xanthane, succinoglycans), modified polysaccharides—preferably among modified starch ethers-, polyvinylic alcohols, polyacrylamides, clays, sepiolites, bentonites, and their mixes, and more preferably chosen in the group of clays, bentonite, montmorillonite.

The possible defoamer g) is preferably chosen in the group comprising, more preferably consisting of: polyether polyols and mixes thereof.

The possible biocide h) is preferably chosen in the group comprising, more preferably consisting of: mineral oxides like zinc oxide and mixes thereof.

The possible pigment i) is preferably chosen in the group comprising, more preferably consisting of: $TiO_2$, iron oxide and mixes thereof.

The possible fibers j) are preferably chosen in the group comprising, more preferably consisting of fibers of polyamid, polyacrylonitrile, polyacrylate, cellulose, polypropylene, glass, sisal, or hemp and their mixes.

The possible mineral binder k) is preferably chosen in the group comprising, more preferably consisting of: portland cement, calcium aluminate cement, calcium sulphate and their mixes.

The possible flame retardant (or flame proof agent), which makes it possible to increase the fire resistance and/or to shrink the speed of flame spreading of the composition is preferably chosen in the group comprising, more preferably consisting of:

minerals preferably aluminium hydroxide [Al(OH)3, ATH], magnesium hydroxide MDH, hydromagnesite, hydrates, red phosphorus, and boron compounds, preferably borates, organohalogen compounds, preferably organochlorines and more preferably such as chlorendic acid derivatives and chlorinated paraffins; organobromines such as decabromodiphenyl ether (decaBDE), decabromodiphenyl ethane, polymeric brominated compounds preferably brominated polystyrenes, brominated carbonate oligomers (BCO's), brominated epoxy oligomers (BEO's), tetrabromophthalic anyhydride, Tetrabromobisphenol A(TBBPA) and hexabromocyclododecane (HBCD).
antimony preferably pentoxide and sodium antimonite
organophosphorus compounds preferably organophosphate, TPP, RDP, BPADP, tri-o-cresyl phosphate,
phosphonates preferably DMMP and phosphinates.
chlorophosphates like TMCP and TDCP.

The composition according to the invention can also comprise some optional functional ingredients like air-entraining agents (surfactants e.g. natural resins, sulfated or sulfonated compounds, synthetic detergents, organic fatty acids and their mixes, preferably among the lignosulfonates, the basic soaps of fatty acids and their mixes, and, more preferably in the group comprising the sulfonate olefins, the sodium lauryl sulfate de sodium and their mixes;

accelerators (calcium salts, carbonates, preferably lithium or sodium and their mixes);

retarders (tartric acid and its salts: sodium or potassium salts, citric acid and its salts: sodium (trisodic citrate) and their mixes;

As regards the quantitative data, the dry powder redispersible composition according to the invention can be the following, in percent by weight and in an increased preference order:

1≤binder a)≤40; 1≤binder a)≤30; 5≤a)≤25; 6≤a)≤20; 8≤a)≤15;
0.1≤deprotection agent b)≤10; 0.5≤b)≤8; 0.8≤b)≤5; 1≤b)≤4;
1≤specific adsorbent filler c)≤85; 1≤specific adsorbent filler c)≤75; 5≤c)≤70; 15≤c)≤60; 25≤c)≤50;
10≤load d)≤90; 20≤d)≤80; 30≤d)≤70; 40≤d)≤60;
0.001≤water retentive agent e)≤5; 0.01≤e)≤3; 0.05≤e)≤1; 0.08≤e)≤1;
0.001≤rheological agent f)≤5; 0.05≤f)≤3; 0.08≤f)≤3; 0.1≤f)≤2
0.01≤defoamer g)≤5; 0.05≤g)≤3; 0.1≤g)≤2; 0.2≤g)≤1;
0.001≤biocide h)≤5; 0.01≤h)≤3; 0.05≤h)≤1; 0.08≤h)≤1
0.01≤pigment i)≤9; 0.05≤i)≤3; 0.1≤i)≤2; 0.2≤i)≤1

The present invention also concerns a wet formulation obtained by mixing water with the redispersible dry composition of polymer finish as above defined, said formulation being preferably plasters, renderings, finishes, grouts, waterproofing coatings or mortars. The mixing is done by any appropriate device known in the art. The mixing time is e.g. 1 to 30 min, or even 3 to 10 min.

The water content of such a wet formulation is preferably comprised between, increasing order of preference and in % by weight of the wet formulation, 5-50; 10-40; 15-25.

Another object of the invention is the application of the wet formulation as above defined onto the surface of buildings or civil engineering works to produce coatings.

Another object of the invention is the buildings or civil engineering works or coatings applied thereon or finishes, obtained from the wet formulation as above defined.

The coatings and the mass works or objects obtained from the redispersible powder polymer composition according to the invention have good application properties.

In particular, the coatings according to the invention produce good results in the usual assessment tests, namely: impact resistance, wet scrub resistance 7 day cure, mandrel bend test 7 day cure, tinting strength, QUV test (accelerated weathering) and drip-test measuring the water-resistance in terms of redispersibility, hardness, colour stability, abrasion resistance and texture appearance.

EXAMPLES

—I— Raw Materials a) powdery organic binder:
  (a.1) redispersible powder acrylic polymer commercialized by ELOTEX under the name WR8600
  (a.2) redispersible powder styrene/acrylic polymer commercialized by BASF under the name ACRONAL® S695P
  (a.3) redispersible powder acrylic polymer commercialized by WACKER® under the name Vinnapas®1540 N
  (a.4) redispersible powder Vinylacetate/Ethylene polymer commercialized by WACKER® under the name Vinnapas®5010 N b) Deprotection agent:
  Triethylene glycol monobutyl ether: commercialized by Münzig under the name Metolat® 872P. content of triethylene glycol monobutyl ether in the powder: 25 to 50%.

c) Specific adsorbent filler:
  (c.1) calcareous filler commercialized by Omya® under the name Beatite® 30
  (c.2) calcareous filler commercialized by Omya® under the name Hydrocarb®-OG d) a load:
  (d.1) calcareous sand commercialized by La Provençale® under the name Calgar®
  (d.2) siliceous sand commercialized by Sibelco France under the name N14
  (d.3) calcareous sand commercialized by Omya® under the name Durcal® 130 e) a water-retentive agent:
  cellulosic ether: commercialized by Dow® chemicals under the name Methocel® f) rheological agent:
  (f.1) sepiolite commercialized by TOLSA® under the name Pangel® S9
  (f 2) silicate mineral commercialized by Rio Tinto Minerals® under the name Talc de Luzenac g) defoamer:
  (g.1) polyglycols commercialized by MUNZIG under the name Agitan P823
  (g.2) polyethers polyols commercialized by KERNEOS® under the name Peramin® defoam 50 PE h) biocide:
  zinc oxide commercialized by Troy® under the name Troysan® CP 20 i) pigment:
  (i.1) $TiO_2$, commercialized by TWT under the name Titanpol R03
  (i.2) Iron oxide commercialized by TWT under the name Noir 318
  (i.3) Sodium alumino-silicate commercialized by holidays pigments under the name Bleu outremer 03 j) fibers:
  (j1) cellulosic fiber commercialized by JRS® under the name Arbocel B00
  (j2) polyacrylonitrile fibers commercialized by STW® under the name PAC243/125 k) mineral binders
  (k1) Calcium Aluminate Cement commercialized by Kerneos® under the name Ternal RG (k2) Calcium Sulfate binder commercialized by Maxit® under the name Anhydrite micronisée Micro A l) and/or a flame retardant (or flame proof agent):
aluminium hydroxide commercialized by Sibelco® under the name portaflame SG 200

—II— Method

The redispersible powder compositions of the examples are prepared as follows:

Each raw material is weighed according to the proportions of the compositions given below in the point III, then introduced into a classical powder mixer. The mixing time varies between 45 sec. and 10 minutes depending on the composition and on the mixer's efficacy.

—III— The Compositions

III.1 Renders, Plasters
In % by weight

Example Formula 1

| | |
|---|---|
| d.1 | 50 |
| c.1 | 32 |
| a1 | 11 |
| i1 | 3 |
| b | 2.2 |
| f1 | 1 |
| g1 | 0.4 |
| e | 0.1 |
| h | 0.1 |
| TOTAL | 100 |

Example Formula 2

| | |
|---|---|
| d.2 | 50 |
| c.1 | 34.8 |
| a.1 | 12 |
| b | 3 |
| e | 0.2 |
| TOTAL | 100 |

Example Formula 3

| | |
|---|---|
| c.1 | 44.6 |
| d.2 | 29 |
| d.1 | 12 |
| a2 | 10 |
| b | 2 |
| i.1 | 1.25 |
| f1 | 0.5 |
| g2 | 0.5 |
| e | 0.15 |
| TOTAL | 100 |

Example Formula 4

| | |
|---|---|
| c.1 | 44.13 |
| d.2 | 30 |
| d.1 | 12 |
| a.1 | 9 |
| b | 4.8 |
| e | 0.07 |
| TOTAL | 100 |

Example Formula 5

| | |
|---|---|
| c.1 | 63.4 |
| a.3 | 25 |
| i.1 | 4 |
| b | 3.5 |
| f.1 | 3 |
| g.2 | 0.7 |
| e | 0.4 |
| TOTAL | 100 |

Example Formula 6

| | |
|---|---|
| d.1 | 50 |
| c.1 | 17.2 |
| l | 15 |
| a.1 | 11 |
| i.1 | 3 |
| b | 2.2 |
| f.1 | 1 |
| g.1 | 0.4 |
| e | 0.1 |
| h | 0.1 |
| TOTAL | 100 |

III.2 Grouts

Example Formula 7

| | |
|---|---|
| c.1 | 77.375 |
| a.1 | 12 |
| f.2 | 5 |
| b | 2.4 |
| i.1 | 2 |
| j.1 | 1 |
| i.2 | 0.2 |
| i.3 | 0.025 |
| TOTAL | 100 |

Example Formula 8

| | |
|---|---|
| c.1 | 80 |
| a.1 | 12 |
| f.2 | 5 |

-continued

| | |
|---|---|
| i.1 | 2 |
| j.1 | 1 |
| b | 0 |
| TOTAL | 100 |

Example Formula 9

| | |
|---|---|
| c.2 | 45 |
| c.1 | 40.6 |
| a.1 | 12 |
| b | 2.4 |
| TOTAL | 100 |

Example Formula 10

| | |
|---|---|
| c.2 | 76 |
| a.1 | 20 |
| b | 4 |
| TOTAL | 100 |

Example Formula 11

| | |
|---|---|
| d.3 | 60 |
| c.1 | 32 |
| a.4 | 6 |
| b | 1 |
| j2 | 1 |
| TOTAL | 100 |

Example Formula 12

| | |
|---|---|
| d.3 | 60 |
| c.1 | 34 |
| a.4 | 4 |
| b | 1 |
| j2 | 1 |
| TOTAL | 100 |

Example Formula 13

| | |
|---|---|
| d.3 | 60 |
| c.1 | 31 |
| a.4 | 8 |
| j.2 | 1 |
| b | 0 |
| TOTAL | 100 |

III.3 Waterproofing

Example Formula 14

| | |
|---|---|
| c.1 | 57.5 |
| a.1 | 40 |
| b | 2 |
| f.1 | 0.5 |
| TOTAL | 100 |

Example Formula 15

| | |
|---|---|
| c.1 | 75.5 |
| a.1 | 20 |
| b | 4 |
| f.1 | 0.5 |
| TOTAL | 100 |

Example Formula 16

| | |
|---|---|
| c.1 | 77.5 |
| a.1 | 20 |
| b | 2 |
| f.1 | 0.5 |
| TOTAL | 100 |

III.4 Formula Containing Mineral Binders

Example Formula 17

| | |
|---|---|
| d.1 | 50 |
| c.1 | 31.2 |
| a.1 | 11 |
| i.1 | 3 |
| b | 2.2 |
| k.1 | 1 |
| f.1 | 1 |
| g | 0.4 |
| e | 0.1 |
| h | 0.1 |
| TOTAL | 100 |

Example Formula 18

| | |
|---|---|
| d.3 | 60 |
| c.1 | 27 |
| a.4 | 6 |
| k.2 | 5 |
| b | 1 |
| j2 | 1 |
| TOTAL | 100 |

—IV— Application Properties

IV.1 Preparation of the Samples

The final product is got by mixing of the powder with some water or inversely, till the obtaining of a homogeneous paste. The water contents for the above mentioned formulas according to the examples are:

| Formula | Water content |
|---|---|
| Formula 1: | 19% +− 1% |
| Formula 2: | 16% +− 1% |
| Formula 3: | 17% +− 1% |
| Formula 4: | 16% +− 1% |
| Formula 5: | 21% +− 1% |
| Formula 6: | 20% +− 1% |
| Formula 7: | 20% +− 1% |
| Formula 8: | 16% +− 1% |
| Formula 9: | 24% +− 1% |
| Formula 10: | 31% +− 1% |
| Formula 11: | 25% +− 1% |
| Formula 12: | 25% +− 1% |
| Formula 13: | 25% +− 1% |
| Formula 14: | 30% +− 1% |
| Formula 15: | 19% +− 1% |
| Formula 16: | 16% +− 1% |
| Formula 17: | 30% +− 1% |
| Formula 18: | 22% +− 1% |

IV.2 the Tests a) Drip Test

Goal:

This test aims at determining the water-resistance of the compositions according to the invention, in terms of redispersibility, hardness, colour stability, abrasion resistance and texture appearance.

In this respect, a "driptest" device was set up to simulate the impact of a rain shortly after application. Low mineral content water will hence be used.

Two commercial products (acrylic renders in pail) which stand for our references, have undergone the test first, to determine test duration and the minimum curing time required before running the experiment. Then, those data may differ accordingly with the nature of the products tested.

Drip test principle for acrylic renders:

Deposits will undergo a constant drip of deionised water, after the determined curing times (4 to 8 hours for acrylic renders) over 30 and 60 minutes.

Flow: 9-12 ml/min

Waterfall height: around 23 cm

Device and settings: Watson-Marlow Limited, 313 Ambient 5 C to 40 C/41 F to 104 F/On time secs=1.5/Off time secs=2.0

The following points will then be checked out:

Abrasion resistance: if the impact of water drops damages the surface (erosion), abrasion resistance under water is considered as poor (marked as "Yes").

Colour stability: after rain, the sample is bound to dry again without any spots or whitening appearing on the surface.

Recovery: Sample should recover its hardness and texture appearance after re-drying.

Redispersibility: right after the driptest, the deposit is checked by scrubbing the surface with a finger (light pressure). As the samples are tinted, redispersibility of the material is determined by the presence of coloured water on the gloves (marked as "Yes").

b) Wet Scrub Resistance 7 Days Cure

Test valuate washability and wet abrasion resistance of a material. The tests reciprocate a wet abrasion force linear over the sample: according Standard ASTM D2486-06 Standard Test Methods for water Scrub Resistance of Wall Paints. The thickness of the finish in the above mentioned test could vary from the one of ASTM D2486-06 norm. The thickness could increase if the granulometry of the largest load is greater to the 180 microns requested in the ASTM D2486-06. The thickness of the finish should then correspond to the maximum diameter of the largest load.

c) Mandrel Bend Test 7 Days Cure

The Mandrel Bend Test covers the determination of the resistance to cracking (flexibility) of an organic coatings applied on substrates of sheet metal. The coating materials under test are applied at uniform thickness to panels of sheet metal. After drying the coated panels are bent over a mandrel and the resistance to cracking of the coating is determined. The noted value is the diameter of the cylinder for which there is no crack.

d) Tinting Strength

Tinting strength is a test which makes it possible to check the colouring capacity of pigments in a given composition. Identical quantities of pigments are introduced in a control composition (here a pasty acrylic finish) and in the sample according to the invention (to be tested). The two-coloured compositions are applied onto a standard support and dried. The tinting strength is measured by a spectrophotometer to determine the cie Lab* and the ΔE (difference of tint between) according to the standard ASTM E-308. If ΔE is less than 1.5, the tints are considered as identical.

E) QUV Accelerated Weathering

The QUV test method is a cyclic ultraviolet weathering procedure. The particular test equipment uses a UV energy source that consists of eight 40-W fluorescent lamps with an emission range of 280 to 350 nm, with continuous peak output at 310 NM. The fluorescent lamps emit UV radiation that emulates the intensity of mid-day June sunlight in Florida. During the exposure tests, oxygenated water is applied to the test samples by condensation, rather than by spray. The water supply is heated in a vented tank below the test racks and lamps. To control the cyclic tests, the QUV is equipped with a variable interval timer that alternates the UV and the condensation at 43° C. followed by 8 hours UV radiation at 60° C. and high humidity.

IV.3 Renders, Plasters Results

| TESTING PARAMETERS | PAREX DPR SAND FINE | FORMULA 1 |
|---|---|---|
| Drip test 24-HRS | No erosion colour stability | No erosion colour stability |
| DRIP TEST (AFTER 4 HRS) | No erosion colour stability | No Erosion colour stability |
| SCRUB RESISTANCE 7 DAYS CURE | 8,000+ CYCLES | 8,000+ CYCLES |
| MANDREL BEND TEST 7 DAYS CURE | 3/16" inch | 1/4" inch |
| TINTING STRENGTH | Same colour | Same colour |
| QUV ACCELERATED WEATHERING | | |
| 500 HRS | Colour stability | Colour stability |
| 2,000 HRS | Colour stability | Colour stability |

PAREX DPR SAND FINE = trade composition of pasty acrylic finish commercialized in the USA by the PAREX ® company = control.

IV.4 Grouts Results

| TESTING PARAMETERS | Scrub Resistance 24 Hours Cure | Scrub Resistance 7 Days Cure |
|---|---|---|
| Formula 7 | >10000 cycles | >10000 cycles |
| Formula 8 | 2300 cycles | 2500 cycles |
| Formula 9 | >10000 cycles | >10000 cycles |
| Formula 10 | >10000 cycles | >10000 cycles |
| Formula 11 | — | >10000 cycles |
| Formula 12 | — | 4500 cycles |
| Formula 13 | — | 600 cycles |

IV.5 Waterproofing Results

| TESTING PARAMETERS | Formula 14 | Formula 15 | Formula 16 |
|---|---|---|---|
| Scrub Resistance 24 Hours Cure | >17000 cycles | >17000 cycles | >17000 cycles |
| Scrub Resistance 7 Days Cure | >17000 cycles | >17000 cycles | >17000 cycles |

IV.6 Mineral Binders Results

| TESTING PARAMETERS | pH value |
|---|---|
| Formula 17 | 9.6 |
| Formula 18 | 6.9 |

The invention claimed is:

1. A redispersible powder composition that forms a water-resistant coating comprising a polymer, comprising:
    a) a powdery organic binder including the polymer obtained by spray-drying or lyophilisation of a dispersion containing the polymer and a protective colloid;
    b) a glycol ether deprotection agent selected from the group consisting of ethylene glycol monomethyl ether, ethylene glycol monoethyl ether, ethylene glycol monopropyl ether, ethylene glycol monoisopropyl ether, (2-isopropoxy)ethanol, ethylene glycol monobutyl ether, ethylene glycol monophenyl ether, ethylene glycol monobenzyl ether, diethylene glycol monomethyl ether, 2-(2-methoxyethoxy) ethanol, diethyleneglycol monoethyl ether, 2-(2-ethoxyethoxy)ethanol, diethylene glycol mono-n-butyl ether, ethylene glycol dimethyl ether, ethylene glycol diethyl ether, ethylene glycol dibutyl ether, ethylene glycol methyl ether acetate, ethylene glycol monethylether acetate, ethylene glycol monobutyl ether acetate, tripropylene glycol n-butyl ether, dipropylene glycol n-butyl ether, and triethylene glycol monobutyl ether, and mixtures thereof, with said deprotection agent being effective without increasing the pH of the dispersion obtained by mixing the composition with water to a value greater than or equal to 10,
    and wherein the % mass ratio of the deprotection agent b)×100/the polymer of part a) is between 15 and 25;
    c) a specific adsorbent filler which has oil absorption (OA) according to ISO 787/5 in unit g/100 g greater than or equal to 20;
    d) a load;
    e) a water retentive agent;
    and at least one of the following products:
    f) a rheological agent;
    g) a defoamer;
    h) a biocide;
    i) a pigment;
    j) fibers;
    k) a mineral binder; and
    i) a flame retardant or flame proof agent; and
    wherein a finished coating applied onto the surface of buildings or civil engineering works, and obtained from a slurry made by mixing the powder composition with water, has a scrub resistance of greater than 4500 cycles as measured by the test ASTM D2486-06.

2. The redispersible powder composition according to claim 1, wherein a finish obtained from a coating obtained from a slurry made by mixing the powder composition with water, has a scrub resistance of greater than 8000 cycles as measured by the test ASTM D2486-06.

3. The redispersible powder composition according to claim 1, wherein a finish obtained from a coating obtained from a slurry made by mixing the powder composition with water, has a scrub resistance of greater than 10000 cycles as measured by the test ASTM D2486-06.

4. The redispersible powder composition according to claim 1, wherein the composition is cement-free, lime-free or both.

5. The redispersible powder composition according to claim 1, wherein the polymer of a) is selected from the group consisting of homopolymer of acrylics, styrene/acrylic copolymer, styrene/butadiene copolymer, vinyl-acetate/ethylene copolymer, vinyl-acetate/versatate copolymer, vinyl-acetate/versatate/ethylene copolymer, acrylic/acrylic copolymer and mixtures thereof.

6. The redispersible powder composition according to claim 1, wherein the load of part d) is selected from the group consisting of calcareous sands, siliceous sands, vermiculite, perlite, and combinations thereof.

7. The redispersible powder composition according to claim 1 wherein the % mass ratio of the specific filler of part c)×100/the polymer of part a) is greater than or equal to 150 and lower than or equal to 850.

8. The redispersible powder composition according to claim 1, wherein the deprotection agent of part b) is chosen among those which are effective without increasing the pH of the dispersion obtained by mixing the composition with water, to a value greater than or equal to 9.

9. The redispersible powder composition according to claim 1 wherein the specific adsorbent filler of part c) is selected from the group consisting of aluminosilicates, calcareous fillers, marble fillers and mixtures thereof.

10. A plaster, rendering, finish or mortar composition comprising the redispersible powder composition according to claim 1.

11. The plaster, rendering, finish or mortar composition of claim 10, wherein the scrub resistance of the plaster, rendering, finish or mortar composition is greater than 4500 cycles.

* * * * *